(12) United States Patent
Yamaguchi et al.

(10) Patent No.: US 11,700,447 B2
(45) Date of Patent: Jul. 11, 2023

(54) RECORDING CONTROL APPARATUS FOR PLURALITY OF IMAGES, RECORDING CONTROL METHOD FOR PLURALITY OF IMAGES, AND NON-TRANSITORY COMPUTER READABLE MEDIUM STORING PLURALITY OF IMAGES

(71) Applicant: JVCKENWOOD Corporation, Yokohama (JP)

(72) Inventors: Yusuke Yamaguchi, Yokohama (JP); Sho Watanabe, Yokohama (JP)

(73) Assignee: JVCKENWOOD CORPORATION, Kanagawa (JP)

(*) Notice: Subject to any disclaimer, the term of this patent is extended or adjusted under 35 U.S.C. 154(b) by 0 days.

(21) Appl. No.: 17/726,411

(22) Filed: Apr. 21, 2022

(65) Prior Publication Data

US 2022/0247920 A1 Aug. 4, 2022

Related U.S. Application Data

(63) Continuation of application No. PCT/JP2020/041046, filed on Nov. 2, 2020.

(30) Foreign Application Priority Data

Nov. 14, 2019 (JP) .................. 2019-206397

(51) Int. Cl.
*H04N 23/60* (2023.01)
*H04N 23/80* (2023.01)
*H04N 23/65* (2023.01)

(52) U.S. Cl.
CPC .......... *H04N 23/64* (2023.01); *H04N 23/651* (2023.01); *H04N 23/80* (2023.01)

(58) Field of Classification Search
CPC ...... H04N 23/64; H04N 23/651; H04N 23/80; H04N 1/00915; H04N 23/60; H04N 23/90;
(Continued)

(56) References Cited

U.S. PATENT DOCUMENTS

2003/0091228 A1* 5/2003 Nagaoka ............... G06V 20/58
382/104
2008/0088482 A1 4/2008 Okada et al.
(Continued)

FOREIGN PATENT DOCUMENTS

| JP | H07304473 A | 11/1995 |
|---|---|---|
| JP | 2008123501 A | 5/2008 |
| JP | 2010074319 A | 4/2010 |

*Primary Examiner* — Usman A Khan
(74) *Attorney, Agent, or Firm* — Procopio, Cory, Hargreaves & Savitch LLP

(57) ABSTRACT

An image recording apparatus includes a recording control unit that records a captured image acquired by the camera image acquisition unit in an image file for each of front cameras, and the degree-of-importance determination unit that determines a degree of importance of each of the plurality of image files. The recording control unit continues to record the captured image in a first image file, and executes close processing on the first image file at a timing based on a recordable duration time during which the captured image is continuously recorded in the first image file as an image file having the highest degree of importance when an electric power supply from a main power unit is cut off and the electric power supply source is switched by an electric power supply source switching unit.

9 Claims, 8 Drawing Sheets

(58) Field of Classification Search
CPC .... H04N 5/77; H04N 1/00904; H04N 1/2129; H04N 23/65; G07C 5/00
USPC ...................................................... 348/222.1
See application file for complete search history.

(56) References Cited

U.S. PATENT DOCUMENTS

| | | | |
|---|---|---|---|
| 2008/0161995 A1* | 7/2008 | Nakajima | G07C 5/0891 |
| | | | 701/32.2 |
| 2009/0109304 A1* | 4/2009 | Guan | H04N 23/61 |
| | | | 348/240.99 |
| 2011/0169978 A1* | 7/2011 | Lasser | A61B 5/0048 |
| | | | 348/222.1 |

* cited by examiner

Fig. 3

RECORDING CONTROL APPARATUS FOR PLURALITY OF IMAGES, RECORDING CONTROL METHOD FOR PLURALITY OF IMAGES, AND NON-TRANSITORY COMPUTER READABLE MEDIUM STORING PLURALITY OF IMAGES

CROSS REFERENCE TO RELATED APPLICATION

This application is based upon and claims the benefit of priority from Japanese Patent Application No. 2019-206397, filed on Nov. 14, 2019, the entire contents of which are incorporated herein by reference.

BACKGROUND

The present invention relates to a recording control apparatus, a recording control method, and a non-transitory computer readable medium.

Patent Literature 1 (Japanese Unexamined Patent Application Publication No. 2008-123501) discloses a drive recorder equipped with a backup power supply. Specifically, when an electric power supply from a battery of a vehicle is cut off, image information recorded in a RAM is thinned out and stored in a CompactFlash card (registered trademark). Thus, even under a situation in which the electric energy to be supplied is limited, information to be recorded can be reliably recorded on the CompactFlash card.

SUMMARY

However, Patent Literature 1 does not disclose processing when a vehicle is equipped with a plurality of cameras.

A first aspect of the present embodiment provides a recording control apparatus including: a captured image acquisition unit configured to acquire captured images from a plurality of image capturing units; an auxiliary power unit serving as an electric power supply source when an electric power supply from a main power unit is cut off; an electric power supply source switching unit configured to switch the electric power supply source to the auxiliary power unit from the main power unit when the electric power supply from the main power unit is cut off; an electric energy acquisition unit configured to acquire auxiliary electric energy serving as electric energy capable of being supplied by the auxiliary power unit; a recording control unit configured to record the captured image acquired by the captured image acquisition unit in an image file for each of the plurality of image capturing units; a degree-of-importance determination unit configured to determine a degree of importance of each of the plurality of image files; and a recordable duration time calculation unit configured to calculate, based on the auxiliary electric energy, a recordable duration time, during which the captured image is continuously recordable in a first image file as an image file having the highest degree of importance, when the electric power supply from the main power unit is cut off and the electric power supply source is switched by the electric power supply source switching unit, wherein the recording control unit continues to record the captured image in the first image file, and executes close processing on the first image file at a timing based on the recordable duration time when the electric power supply from the main power unit is cut off and the electric power supply source is switched by the electric power supply source switching unit.

A second aspect of the present embodiment provides a recording control apparatus including: a captured image acquisition unit configured to acquire captured images from a plurality of image capturing units; an auxiliary power unit serving as an electric power supply source when an electric power supply from a main power unit is cut off; an electric power supply source switching unit configured to switch the electric power supply source to the auxiliary power unit from the main power unit when the electric power supply from the main power unit is cut off; an electric energy acquisition unit configured to acquire auxiliary electric energy serving as electric energy capable of being supplied by the auxiliary power unit; a recording control unit configured to record the captured image acquired by the captured image acquisition unit in image files for the plurality of image capturing units; and a degree-of-importance determination unit configured to determine a degree of importance of each of the plurality of image files, wherein the recording control unit executes close processing on a first image file as an image file having the highest degree of importance, and starts to record a captured image from an image capturing unit corresponding to the first image file in a second image file in which an image recording time is set according to the auxiliary electric energy when the electric power supply from the main power unit is cut off and the electric power supply source is switched by the electric power supply source switching unit.

A third aspect of the present embodiment provide a recording control method of a recording control apparatus including an auxiliary power unit serving as an electric power supply source when an electric power supply from a main power unit is cut off, the method including: a captured image acquisition step of acquiring captured images from a plurality of image capturing units; an electric power supply source switching step of switching the electric power supply source to the auxiliary power unit from the main power unit when the electric power supply from the main power unit is cut off; an electric energy acquisition step of acquiring auxiliary electric energy serving as electric energy capable of being supplied by the auxiliary power unit; a recording control step of recording the captured image acquired in the captured image acquisition step in an image file for each of the plurality of image capturing units; a degree-of-importance determination step of determining a degree of importance of each of the plurality of image files; and a recordable duration time calculation step of calculating, based on the auxiliary electric energy, a recordable duration time, during which the captured image is continuously recordable in a first image file as an image file having the highest degree of importance, when the electric power supply from the main power unit is cut off and the electric power supply source is switched, wherein the recording control step includes continuing to record the captured image in the first image file, and executing close processing on the first image file at a timing based on the recordable duration time when the electric power supply from the main power unit is cut off and the electric power supply source is switched.

BRIEF DESCRIPTION OF THE DRAWINGS

FIG. 3 is a view illustrating storage contents of an SD card (first embodiment);

DETAILED DESCRIPTION

First Embodiment

A first embodiment will be described with reference to FIGS. 1 to 4.

Figure 1:
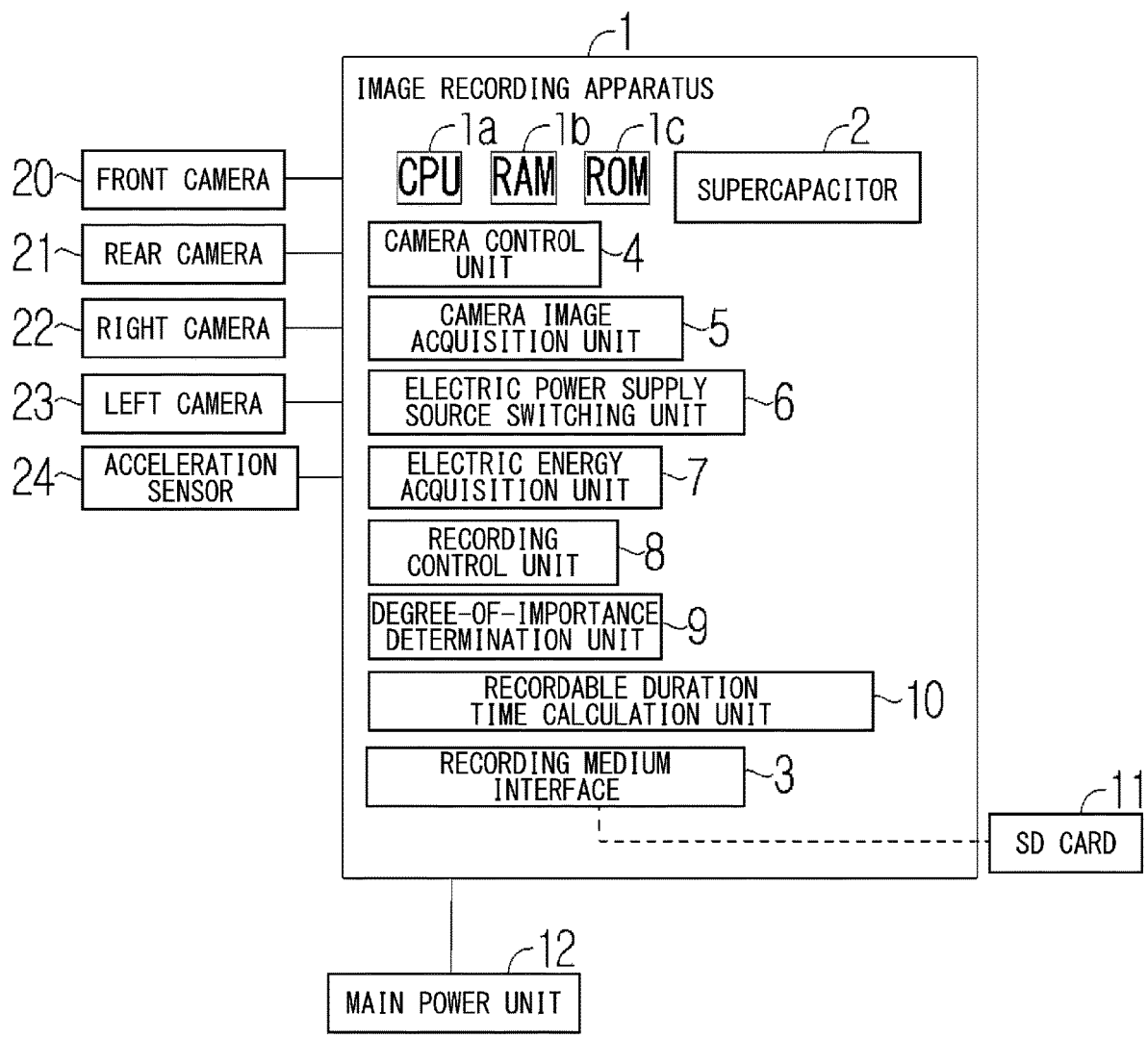
FIG. 1 is a functional block diagram of an image recording apparatus (first embodiment)

FIG. 1 shows a functional block diagram of an image recording apparatus 1. The image recording apparatus 1 is a specific example of a recording control apparatus. As shown in FIG. 1, the image recording apparatus 1 includes a CPU 1a (Central Processing Unit) as a central processor, a RAM 1b (Random Access Memory) as a volatile recording medium that is readable and writable, and a read-only ROM 1c (Read Only Memory). Further, the image recording apparatus 1 includes a supercapacitor 2 as an auxiliary power unit and a recording medium interface 3.

When the CPU 1a reads out and executes a control program stored in the ROM 1c, the control program causes hardware such as the CPU 1a to function as various functional units. The various functional unit include a camera control unit 4, a camera image acquisition unit 5, an electric power supply source switching unit 6, an electric energy acquisition unit 7, a recording control unit 8, a degree-of-importance determination unit 9, and a recordable duration time calculation unit 10.

The image recording apparatus 1 is connected to a front camera 20, a rear camera 21, a right camera 22, a left camera 23, and an acceleration sensor 24 as an acceleration detection unit. The front camera 20, the rear camera 21, the right camera 22, and the left camera 23 have different image capturing directions from each other. The image recording apparatus 1 may include these cameras.

The front camera 20 is a specific example of an image capturing unit that captures an image of a front of a vehicle, and is typically mounted to the vicinity of a front grille of the vehicle or an upper part of a windshield. The front camera 20 outputs the captured image to the image recording apparatus 1.

The rear camera 21 is a specific example of an image capturing unit that captures an image of a rear of the vehicle, and is typically mounted to the vicinity of a rear bumper of the vehicle, an upper part of a rear window, or the vicinity of a rear license plate. The rear camera 21 outputs the captured image to the image recording apparatus 1.

The right camera 22 is a specific example of an image capturing unit that captures an image of a right side of the vehicle, and is typically mounted to a right door mirror. The right camera 22 outputs the captured image to the image recording apparatus 1.

The left camera 23 is a specific example of an image capturing unit that captures an image of a left side of the vehicle, and is typically mounted to a left door mirror. The left camera 23 outputs the captured image to the image recording apparatus 1.

In the present embodiment, the front camera 20, the rear camera 21, the right camera 22, and the left camera 23 are connected to the image recording apparatus 1, but alternatively, at least two or three of the front camera 20, the rear camera 21, the right camera 22, and the left camera 23 may be connected to the image recording apparatus 1. Further, for example, a plurality of image capturing units having overlapping image capturing directions but different image capturing ranges may be connected to the image recording apparatus 1, and in this case, the plurality of image capturing units includes the front camera 20 and an ultra-wide-angle camera capable of making 360° omnidirectional photographing.

The acceleration sensor 24 is a specific example of the acceleration detection unit that detects acceleration acting on the vehicle, and outputs the detection result to the image recording apparatus 1. The image recording apparatus 1, the front camera 20, the rear camera 21, the right camera 22, and the left camera 23 may include the acceleration sensor 24.

The supercapacitor 2 is a specific example of the auxiliary power unit, and serves as an electric power supply source of the image recording apparatus 1 when electric power supply from a main power unit 12 is cut off. The main power unit 12 is a typically an in-vehicle battery. The image recording apparatus 1 receives the electric power supplied from the main power unit 12 in a normal state. When the electric power supply from the main power unit 12 to the image recording apparatus 1 is cut off due to an accident in which the vehicle is involved and the like, the supercapacitor 2 serves as an electric power supply source of the image recording apparatus 1 instead of the main power unit 12. The auxiliary power unit may be a combination of the supercapacitor 2 and a control circuit that controls an output voltage and an output current. The auxiliary power unit is not limited to the supercapacitor 2, and may be an auxiliary battery or an electric cell, for example.

The camera control unit 4 controls operations of the front camera 20, the rear camera 21, the right camera 22, and the left camera 23. In the present embodiment, the front camera 20 and the like operate by receiving the electric power supply from the image recording apparatus 1. In other words, the camera control unit 4 starts image-capturing of the front camera 20 by starting to supply operation power to the front camera 20, and stops the image-capturing of the front camera 20 by stopping to supply the operation power to the front camera 20. The main power unit 12 may be configured to directly supply the operation power to the front camera 20 without intervention of the image recording apparatus 1. The same applies to the rear camera 21, the right camera 22, and the left camera 23.

The camera image acquisition unit 5 acquires, for example, 30 captured images per second from each of the front camera 20, the rear camera 21, the right camera 22, and the left camera 23, and stores the acquired captured images in the RAM 1b.

The RAM 1b is used as a so-called ring buffer. In other words, when storing the captured image to be newly stored in the RAM 1b, the camera image acquisition unit 5 overwrites such a captured image in a storage region of the captured image having the oldest image-capturing time.

Figure 2:
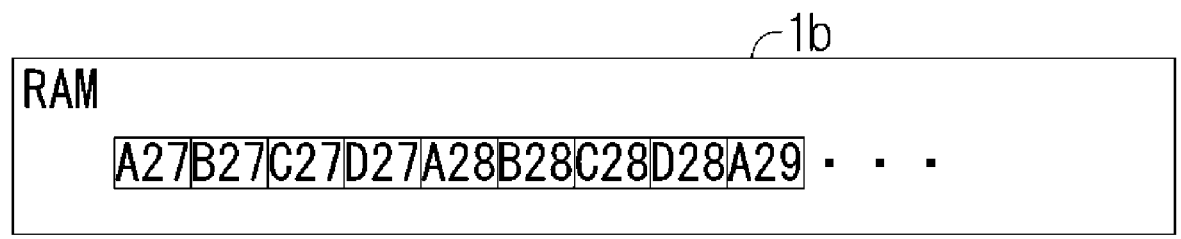
FIG. 2 is a view illustrating storage contents of a RAM (first embodiment)

FIG. 2 illustrates storage contents of the RAM 1b. The camera image acquisition unit 5 stores contents, in which the captured image acquired from the front camera 20 is added with image-capturing time information indicating an captured time and identification information of the front camera 20, in the RAM 1b. For example, "A" of "A27" indicates identification information for specifying the front camera 20, and "27" indicates image-capturing time information of the captured image. The image-capturing time information is a serial number assigned per image-capturing frame, per unit time of image capturing such as every minute, and per image file, for example. The "A27" may be a file name of the captured image, or may be written in header information of the captured image. The same applies to the rear camera 21, the right camera 22, and the left camera 23. "B" indicates the rear camera 21, "C" indicates the right camera 22, and "D" indicates the left camera 23. The storage form of the RAM 1*b* is not limited to the example illustrated in FIG. 2, and the storage region may be separated for each camera.

Returning to FIG. 1, the electric power supply source switching unit 6 switches the electric power supply of the image recording apparatus 1 to the supercapacitor 2 from the main power unit 12 when the electric power supply from the main power unit 12 is cut off. The electric power supply source switching unit 6 can detect using a known technique that the electric power supply from the main power unit 12 is cut off. The electric power supply source switching unit 6 may, for example, monitor the output voltage or the output current of the main power unit 12 to detect that the electric power supply is cut off, or may acquire an error signal output from the main power unit 12 to detect that the electric power supply is cut off.

The electric energy acquisition unit 7 acquires auxiliary electric energy that is electric energy capable of being supplied by the supercapacitor 2. The electric energy acquisition unit 7 can acquire the auxiliary electric energy that is electric energy capable of being supplied by the supercapacitor 2, using a known technique. For example, the electric energy acquisition unit 7 may acquire the auxiliary electric energy by subtracting a cumulative value of the electric power supplied by the supercapacitor 2 from a cumulative value of the electric power supplied to the supercapacitor 2, or may acquire a voltage of an output terminal of the supercapacitor 2 to acquire the auxiliary electric energy based on a correlation between the output voltage and the auxiliary electric energy.

The recording medium interface 3 is used to read-write access an SD card 11 (registered trademark), which is a specific example of the recording medium, and includes a slot into which the SD card 11 is inserted and a controller for reading and writing the SD card 11. The SD card 11 is a specific example of a non-volatile recording medium and a portable recording medium. The non-volatile recording medium may be, for example, a compact flash memory (registered trademark) or a hard disk instead of the SD card.

Figure 3:
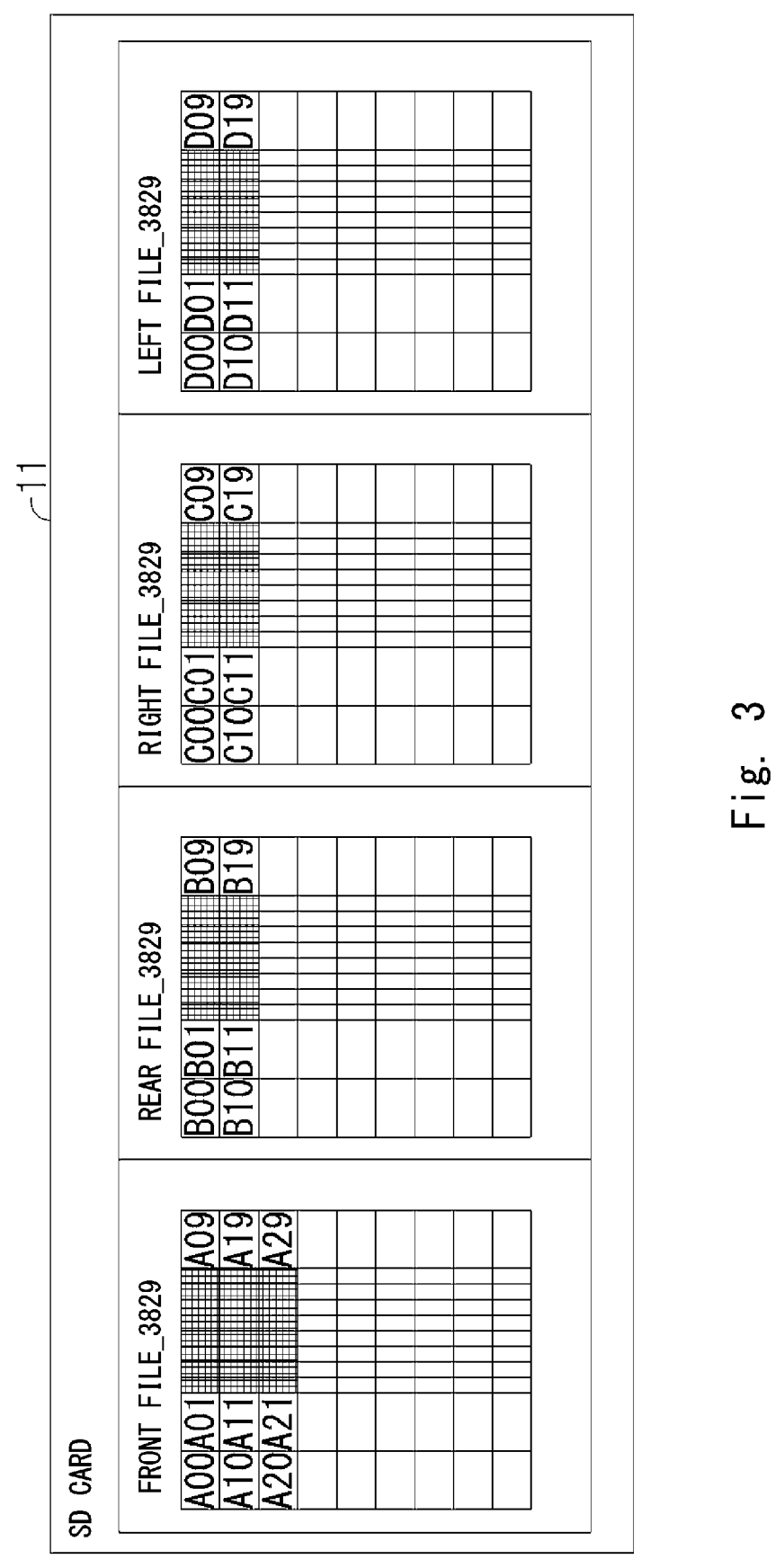

The recording control unit 8 creates a separate image file for each camera in the SD card 11, and then records the captured image stored in the RAM 1*b* in the corresponding image file. FIG. 3 illustrates a part of storage contents of the SD card 11.

In FIG. 3, an image file corresponding to the front camera 20 is preserved in the SD card 11 with a file name "front file_3829". Similarly, an image file corresponding to the rear camera 21 is preserved in the SD card 11 with a file name "rear file_3829". Similarly, an image file corresponding to the right camera 22 is preserved in the SD card 11 with a file name "right file_3829". Similarly, an image file corresponding to the left camera 23 is preserved in the SD card 11 with a file name "left file_3829".

An image recording time, which is a total playback time of the image recorded in one image file, is set to a short time such as one minute or five minutes, and a long-time image is preserved by being divided into a plurality of image files for such a time. The number "_3829" shown in FIG. 3 is a serial number assigned to the plurality of image files divided in order of time series. In other words, the SD card 11 preserves not only the "front file_3829" but also a "front file_3828", a "front file_3827", and a "front file_3826", for example.

Further, the recording control unit 8 is configured to record a plurality of captured images of a predetermined number of frames at a tail of the corresponding image file of the SD card 11 when the captured images to be newly recorded are accumulated in the RAM 1*b* with a predetermined number of frames. In the examples of FIGS. 2 and 3, when the captured images to be newly recorded are accumulated in the RAM 1*b* with 10 frames, the 10 frames of captured images, that is, captured images indicated by, for example, A20, A21, A22 . . . A28, and A29 are recorded at a tail of the front file_3829 of the SD card 11. The predetermined number of frames is not limited to 10 frames, and may be, for example, 5 frames, 20 frames, or 1 frame. In this way, the recording control unit 8 sequentially accumulates the captured images in the image file of the SD card 11, and executes close processing on the image file at a state of accumulating the captured image for the above-described image recording time, whereby the image file is decided as a valid image file that can be read.

The degree-of-importance determination unit 9 determines the degree of importance of each of the plurality of image files stored in the SD card 11. In the present embodiment, the degree-of-importance determination unit 9 determines of each of the plurality of image files such that the image file corresponding to the camera having the image capturing direction closest to a direction opposite to the direction of the acceleration detected by the acceleration sensor 24 has the highest degree of importance.

For example, when an own vehicle collides head-on with another vehicle, the own vehicle momentarily accelerates toward the rear side, so that the degree-of-importance determination unit 9 determines of each of the plurality of image files such that the image file corresponding to the front camera 20 having the image capturing direction closest to the front side opposite to the rear side, that is, the front file_3829 has the highest degree of importance. Further, for example, when the own vehicle collides head-on with another vehicle in front of the right side, the degree-of-importance determination unit 9 determines of each of the plurality of image files such that the image files corresponding to the front camera 20 and the right camera 22 having the front and right image capturing directions, that is, the front file and the right file have the highest degree of importance. It is more preferable to determine based on an angle of collision which of the front file and the right file is more important.

Further, for example, when the own vehicle is hit by another vehicle from the rear side, the own vehicle momentarily accelerates toward the front side, so that the degree-of-importance determination unit 9 determines the degree of importance of each of the plurality of image file such that the image file corresponding to the rear camera 21 having the image capturing direction closest to the rear side opposite to the front side, that is, the rear file_3829 has the highest degree of importance.

The degree-of-importance determination unit 9 may determine the degree of importance of each of the plurality of image files only when the acceleration detected by the acceleration sensor 24 is equal to or higher than a predetermined value. In addition, the degree-of-importance determination unit 9 may determine the degree of importance of each of the plurality of image files only when the electric power supply source is switched by the electric power supply source switching unit 6 which will be described below.

Preferably, the degree-of-importance determination unit 9 determines the degree of importance of each of the plurality of image files such that the image file corresponding to the camera having the image capturing direction closest to the direction opposite to the direction, in which the largest acceleration is detected, has the highest degree of importance within a predetermined period up to a point of time going back in time from a point of time when the acceleration detected by the acceleration sensor 24 is equal to or higher than the predetermined value or when the electric power supply from the main power unit is cut off and the electric power supply source is switched.

The "degree of importance" may be expressed by a numerical value that becomes larger as the importance increases, or may be expressed by a numerical value that becomes smaller as the importance reduces. The numerical value may be any numerical value, for example, from 0 (lowest importance) to 100 (highest importance), or from 1 (highest importance) to 5 (lowest importance).

The recordable duration time calculation unit 10 calculates a recordable duration time, during which the captured image is continuously recordable in the first image file as an image file having the highest degree of importance, when the electric power supply from the main power unit 12 is cut off and the electric power supply source is switched by the electric power supply source switching unit 6, based on the auxiliary electric energy of the supercapacitor 2 acquired by the electric energy acquisition unit 7. In other words, the recordable duration time calculation unit 10 calculates a time during which the image recording apparatus 1 can be continuously operated by the electric power supply from the supercapacitor 2 by dividing auxiliary electric energy serving as surplus power obtained by subtracting electric energy required for performing the close processing on the file, which will be described below, from the auxiliary electric energy of the supercapacitor 2 into power consumption per unit time of the image recording apparatus 1, and the time can be set as a recordable duration time. The surplus auxiliary electric energy may be electric energy required other than the close processing on the file, for example, electric energy obtained by further subtracting electric power required for a process of stopping the electric power supply to an unnecessary camera to be described below and margin electric energy from the auxiliary electric energy of the supercapacitor 2.

In the present embodiment, since the front camera 20 and the like are configured to operate by the electric power supply from the image recording apparatus 1, the power consumption per unit time of the image recording apparatus 1 is added with the power consumption per unit time of the front camera 20 and the like. Therefore, when the electric power supply from the main power unit 12 is cut off and the electric power supply source is switched by the electric power supply source switching unit 6, the power supply to the unnecessary camera is stopped, and thus the power consumption per unit time of the image recording apparatus 1 can be kept low. Similarly, the recording of the unnecessary camera into an image file is stopped, and thus the power consumption per unit time of the image recording apparatus 1 can be kept low. Here, the "unnecessary camera" means, for example, a camera other than the camera corresponding to the first image file as the image file having the highest degree of importance. For example, when the own vehicle collides head-on with another vehicle, the front file_3829 corresponds to the first image file, and the rear camera 21, the right camera 22, and the left camera 23 correspond to the unnecessary cameras. The "unnecessary camera" may mean a camera having a degree of importance, which is determined by the degree-of-importance determination unit 9, lower than a predetermined threshold value, or may mean a camera having the lowest degree of importance.

Then, when the electric power supply from the main power unit 12 is cut off and the electric power supply source is switched by the electric power supply source switching unit 6, the recording control unit 8 continues to record the captured image in the first image file, and executes close processing on the first image file when the recordable duration time has elapsed. Thereby, even when the electric power supply from the main power unit 12 is cut off and the electric power supply source is switched by the electric power supply source switching unit 6, since a recordable image time of the first image file is extended as much as possible, the first image file will greatly contribute to post verification after an accident.

Here, the close processing is processing of completing information in a format of each of files such that the image file can be established as a file that can be handled by other devices. For example, in the close processing, the front file_3829 shown in FIG. 3 is established as one file together with information such as a file name and a time stamp according to a moving picture format such as MPEG (Moving Picture Experts Group). Another example of the close processing includes processing of adding a few bytes of predetermined data to the tail of the image file, which is the target of the close processing, to decide the tail of the storage region of the image file.

Figure 4:
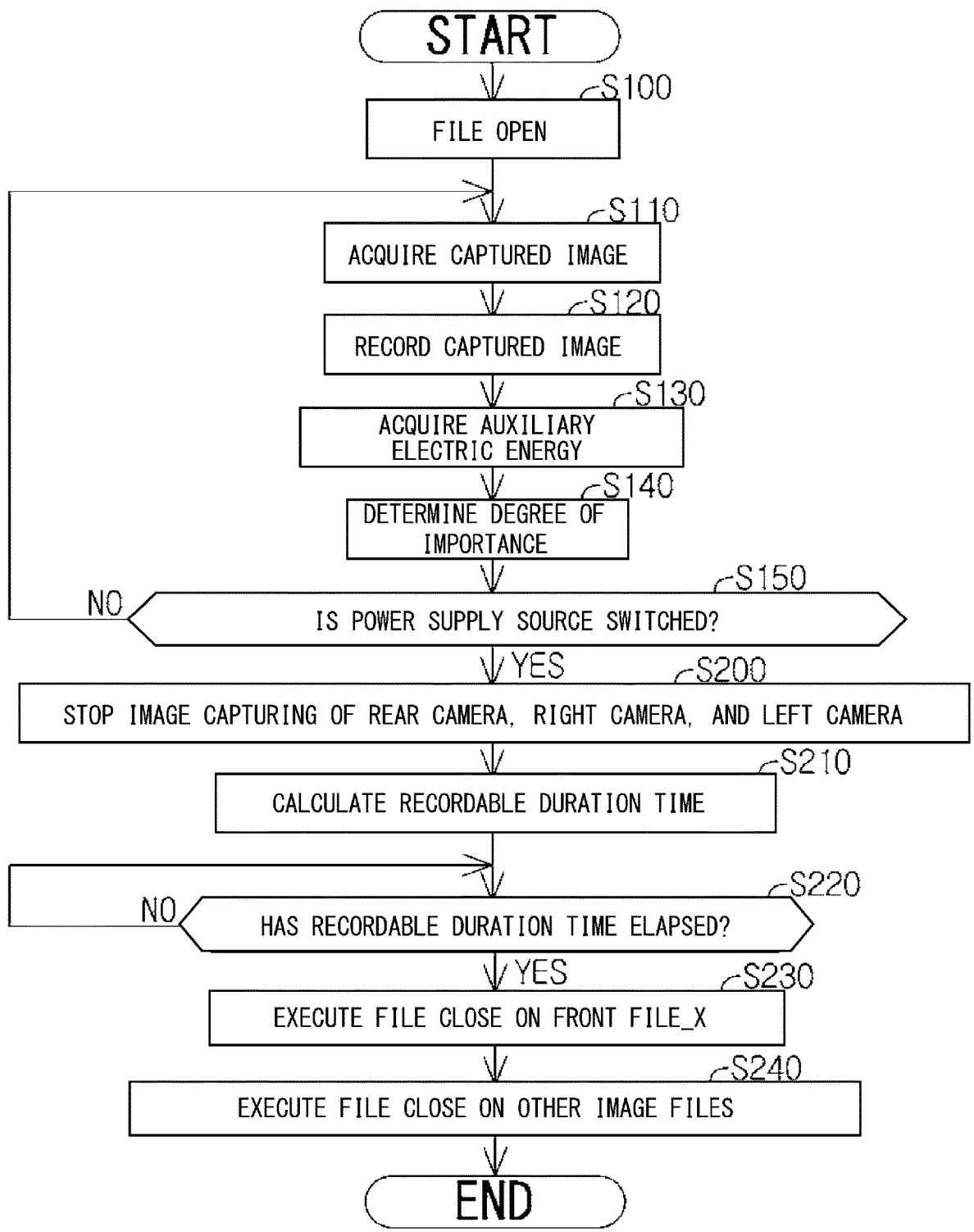
FIG. 4 is a control flowchart of the image recording apparatus (first embodiment)

Next, an operation of the image recording apparatus 1 will be described with reference to FIG. 4.

S100:

First, the recording control unit 8 performs a file open on the respective image files on the SD card 11 recorded with the captured images acquired from the respective cameras, specifically, the front file_3829, the rear file_3829, the right file_3829, and the left file_3829. Specifically, the file open is a process for securing the storage region required for storing each of the image files in the SD card 11 in advance without duplication, and an address of a write pointer for writing is set to a head address of each file.

S110 (Captured Image Acquisition Step):

Next, the camera image acquisition unit 5 acquires the captured images from the front camera 20, the rear camera 21, the right camera 22, and the left camera 23, and temporarily stores the acquired captured image in the RAM 1b as shown in FIG. 2.

S120 (Recording Control Step):

Next, the recording control unit 8 acquires captured images from the RAM 1b for a predetermined number of frames, and records the plurality of acquired captured images at positions of the write pointers of the corresponding image files on the SD card 11. The recording process causes the above-described write pointer to move back as appropriate.

S130 (Electric Energy Acquisition Step):

Next, the electric energy acquisition unit 7 acquires auxiliary electric energy that is electric energy capable of being supplied by the supercapacitor 2.

S140 (Degree-of-Importance Determination Step):

Next, the degree-of-importance determination unit 9 determines a degree of importance of each of a plurality of image files, based on the detection result from the acceleration sensor 24.

S150 (Electric Power Supply Source Switching Step):

Next, the recording control unit 8 determines whether the electric power supply from the main power unit 12 is cut off and the power supply source is switched. When the recording control unit 8 determines that the electric power supply from the main power unit 12 is cut off and the power supply source is switched (S150: YES), the process proceeds to S200. On the other hand, when the recording control unit 8 determines that the power supply source is not switched (S150: NO), the process returns to S110.

The degree-of-importance determination unit 9 may execute a determination process of S140 after the determination of S150, or may execute the determination process of S140 substantially at the same time as the determination of S150.

Hereinafter, a description will be continued assuming that the first image file as the image file determined to have the highest degree of importance by the degree-of-importance determination unit 9 is the front file_3829.

S200:

First, the camera control unit 4 stops the image capturing of the cameras other than the front camera 20 corresponding to the front file_3829, that is, the rear camera 21, the right camera 22, and the left camera 23. Thus, the power consumption per unit time of the image recording apparatus 1 is reduced.

S210 (Recordable Duration Time Calculation Step):

Next, the recordable duration time calculation unit 10 calculates a recordable duration time based on the auxiliary electric energy of the supercapacitor 2.

S220:

The recording control unit 8 determines whether the recordable duration time has elapsed from a point of time when the above-described recordable duration time is calculated, while continuing the recording of the captured image in the front file_3829. When the recording control unit 8 determines that the recordable duration time has not elapsed (S220: NO), the process of S220 is repeated. On the other hand, when the recording control unit 8 determines that the recordable duration time has elapsed (S220: YES), the process proceeds to S230.

S230:

Next, the recording control unit 8 executes close processing on the front file_3829.

S240:

Thereafter, when the electric power supply from the supercapacitor 2 continues, the recording control unit 8 executes close processing on other image files, that is, the rear file_3829, the right file_3829, and the left file_3829 at the timing based on the recordable duration time. In this case, it is preferable to execute the close processing in order from the image file having a relatively high degree of importance. For example, when the own vehicle collides head-on with another vehicle, since the following vehicle may collide with the own vehicle after the head-on collision, the degree-of-importance determination unit 9 preferably determines that the degree of importance of the rear file_3829 is higher than the degrees of importance of the right file_3829 and the left file_3829. In this case, when the close processing for the front file_3829 is completed (S230), the recording control unit 8 subsequently executes the close processing on the rear file_3829 at the timing based on the recordable duration time.

Although the first embodiment has been described above, the above-described embodiment has the following features.

The image recording apparatus 1 includes the camera image acquisition unit 5 as the captured image acquisition unit that acquires the captured images from the front camera 20 and the like, and the supercapacitor 2 as the auxiliary power unit serving as the electric power supply source when the electric power supply from the main power unit 12 is cut off. The image recording apparatus 1 includes the electric power supply source switching unit 6 that switches the electric power supply source to the supercapacitor 2 from the main power unit 12 when the electric power supply from the main power unit 12 is cut off, and the electric energy acquisition unit 7 that acquires the auxiliary electric energy serving as the electric energy capable of being supplied by the supercapacitor 2. The image recording apparatus 1 includes the recording control unit 8 that records the captured image acquired by the camera image acquisition unit 5 in the separate image file for each of the front cameras 20, and the degree-of-importance determination unit 9 that determines the degree of importance of each of the plurality of image files. The image recording apparatus 1 includes the recordable duration time calculation unit 10 that calculates the recordable duration time, during which the captured image is continuously recordable in the first image file as an image file having the highest degree of importance, when the electric power supply from the main power unit 12 is cut off and the electric power supply source is switched by the electric power supply source switching unit 6, based on the auxiliary electric energy. When the electric power supply from the main power unit 12 is cut off and the electric power supply source is switched by the electric power supply source switching unit 6, the recording control unit 8 continues to record the captured image in the first image file (S220), and executes the close processing on the first image file (S230) when the recordable duration time has elapsed. According to the above configuration, even when the electric power supply from the main power unit 12 is cut off and the electric power supply source is switched by the electric power supply source switching unit 6, the recordable image time of the first image file is extended as much as possible, and thus the first image file will greatly contribute to post verification after an accident.

The image recording apparatus 1 further includes the camera control unit 4 as an image-capturing control unit that controls the front camera 20 and the like. The front camera 20 and the like are configured to be operated by the electric power supply from the image recording apparatus 1. The camera control unit 4 stops the image capturing of the cameras other than the camera corresponding to the first image file when the electric power supply from the main power unit 12 is cut off and the electric power supply source is switched by the electric power supply source switching unit 6. According to the configuration described above, since the power consumption per unit time of the image recording apparatus 1 is reduced, the recordable image time of the first image file can be further extended.

The recording control unit 8 executes the close processing on the first image file, and then executes the close processing on at least one of the image files other than the first image file. According to the configuration described above, the image files other than the first image file are also subjected to the close processing, which contributes to post verification after an accident.

Further, the degree-of-importance determination unit 9 specifies, as the most important image file, the image file corresponding to the image capturing unit having the image capturing direction closest to the direction opposite to the direction of the acceleration detected by the acceleration sensor 24 (acceleration detection unit). At this time, when there are a plurality of image files having the same degree of importance, the recordable duration time calculated by the recordable duration time calculation unit 10 may be allocated to each of the plurality of image files. For example, when the front file_3829 and the right file_3829 have the same degree of importance and the recordable duration time calculated by the recordable duration time calculation unit 10 is 30 seconds, the recordable duration time of each of the front file_3829 and the right file_3829 may be 15 seconds. When both the degrees of importance of the front file_3829 and the right file_3829 exceed a predetermined level, the degrees of importance of the front file_3829 and the right file_3829 are different from each other, and the recordable duration time calculated by the recordable duration time calculation unit 10 is 30 seconds, the recordable duration time of the front file_3829 and the recordable duration time of the right file_3829 may be allocated to, for example, 20 seconds and 10 seconds, respectively, based on such degrees of importance. According to the configuration described above, it is possible to reliably perform the close processing on the image file corresponding to a direction in which the collision occurred.

After executing the close processing on the first image file, the recording control unit 8 may set, based on the degree of importance of each of the image files for recording the captured images other than the image capturing unit corresponding to the first image file, the recordable duration time for each of the image files for recording the captured images other than the image capturing unit corresponding to the first image file, and execute the close processing on each of the image files for recording the captured images other than the image capturing unit corresponding to the first image file at the timing based on the recordable duration time. For example, when the degree of importance of the rear file_3829 is p1 and the degree of importance of the right file_3829 is p2, the recording control unit 8 sets the recordable duration time of each of the image files such that a ratio of the recordable duration time of the rear file_3829 to the recordable duration time of the right file_3829 is p1:p2. Then, the recording control unit 8 executes the close processing on the rear file_3829 at a timing based on the recordable duration time of the rear file_3829 (typically, a timing when the recordable duration time of the rear file_3829 has elapsed), and executes the close processing on the right file_3829 at a timing based on the recordable duration time of the right file_3829 (typically, a timing when the recordable duration time of the right file_3829 has elapsed) at the same time.

The first embodiment can be changed as follows.

After executing the close processing on the front file_3829 (S230), the recording control unit 8 may create a front file_3830 (second image file) as a new image file corresponding to the front camera 20 on the SD card 11, and start recording of the captured image to the front file_3830. In this case, it is preferable that the image recording time of the image file is shortened as compared a case before the electric power supply source is switched by the electric power supply source switching unit 6. In other words, for example, when the image recording time of the image file is set to one minute before the electric power supply source of the electric power supply source switching unit 6 is switched, the recording control unit 8 may shorten the image recording time of the image file to 10 seconds, for example. Thus, since the image file corresponding to the front camera 20 is divided into small pieces, even when the electric power supply from the supercapacitor 2 is cut off and the operation of the image recording apparatus 1 suddenly stops, it is possible to extend the recording time of the front image captured by the front camera 20 as much as possible. At this time, the recording control unit 8 may set the image recording time of the front file_3830 according to the auxiliary electric energy acquired by the electric energy acquisition unit 7.

Second Embodiment

Figure 5:
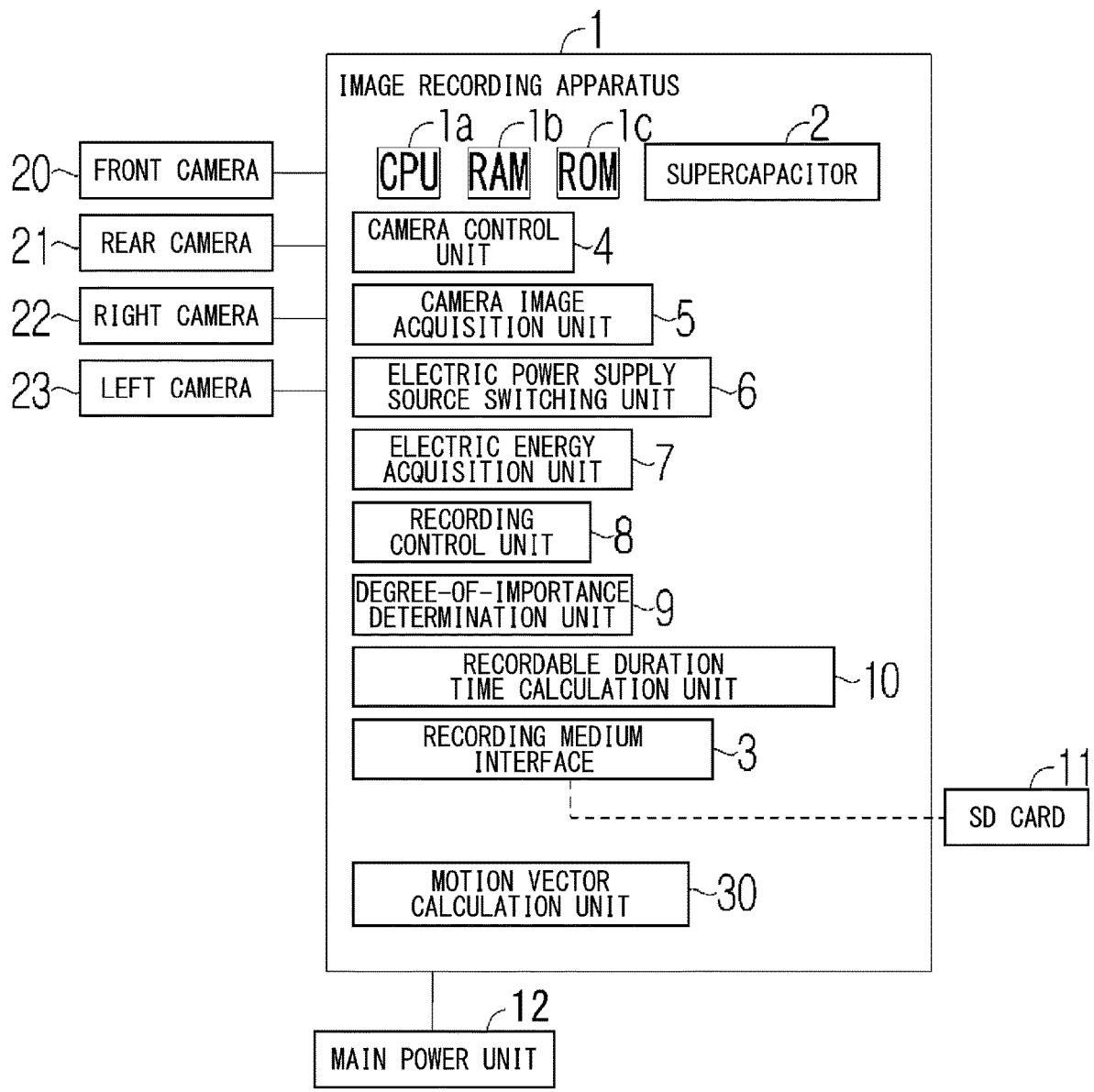
FIG. 5 is a functional block diagram of an image recording apparatus (second embodiment)

A second embodiment will be described below with reference to FIG. 5. Hereinafter, a description will mainly be given with respect to differences between the present embodiment and the first embodiment, and duplicated description will not be given.

As shown in FIG. 1, in the first embodiment, the acceleration sensor 24 is connected to the image recording apparatus 1. On the other hand, in the present embodiment, as shown in FIG. 5, the acceleration sensor 24 is not provided. The image recording apparatus 1 includes a motion vector calculation unit 30 that calculates a motion vector for each of a plurality of image files. The motion vector calculation unit 30 can be realized as various functional units by a control program stored in the ROM 1c.

The motion vector is to represent a motion from a reference frame as a vector. A method of calculating the motion vector is typically a block matching method, but is not limited thereto.

Then, the degree-of-importance determination unit 9 determines the degree of importance of each of the plurality of image files, based on the motion vector calculated by the motion vector calculation unit 30. Specifically, the degree-of-importance determination unit 9 calculates a total scalar amount of the motion vector for each of the plurality of image files, determines the degree of importance of the image file having a relatively large total scalar amount to be relatively high, and determines the degree of importance of the image file having a relatively small scalar amount to be relatively low. Further, when the vehicle is running, the motion of the right file_3829 and the left file_3829, which are images generally photographed in a horizontal direction, becomes large, and the total scalar amount of the right file_3829 and the left file_3829 is large, whereby it is preferable to determine the degree of importance of each of the image files based on the amount of change in the scalar amount instead of the absolute value of the total scalar amount. Alternatively, weighting of the front file_3829, the rear file_3829, the right file_3829, and the left file_3829 is changed, conversion is performed such that the scalar amount after the weighting is the same for each of the image files, and thus the direction in which the cause of the accident occurred may be determined based on the total scalar amount of the motion vector after the weighting.

According to the configuration described above, it is possible to highly determine the degree of importance of the image file in which the direction in which the cause of the accident occurred is captured without using the acceleration sensor 24.

Third Embodiment

Figure 6:
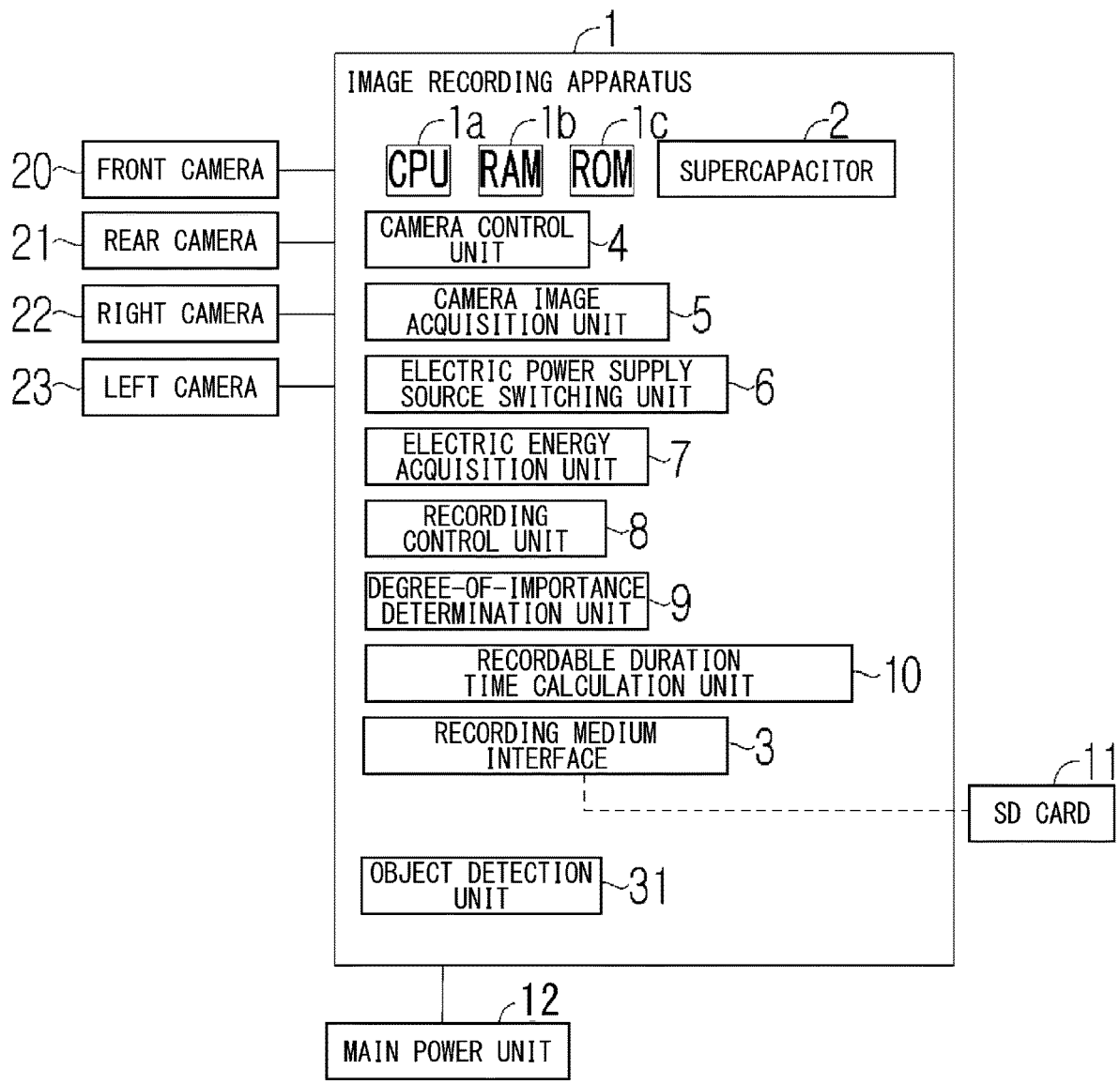
FIG. 6 is a functional block diagram of an image recording apparatus (third embodiment)

A third embodiment will be described below with reference to FIG. 6. Hereinafter, a description will mainly be given with respect to differences between the present embodiment and the first embodiment, and duplicated description will not be given.

As shown in FIG. 1, in the first embodiment, the acceleration sensor 24 is connected to the image recording apparatus 1. On the other hand, in the present embodiment, as shown in FIG. 6, the acceleration sensor 24 is not provided. The image recording apparatus 1 includes an object detection unit 31 that detects an object appearing in the image file for each of a plurality of image files and calculates a distance to the object. The object detection unit 31 can be realized as various functional units by a control program stored in the ROM 1c. A known technique such as an image recognition may be used to detect the object.

Specific examples of the above-described objects include moving objects such as another vehicle and pedestrians reflected in the captured image, guardrails, side walls, and utility poles, but are not limited thereto.

When the front camera 20 is typically configured as a stereo camera, the distance from the front camera 20 to the object reflected in the image file corresponding to the front camera 20 can be calculated. However, without being limited thereto, the distance from the front camera 20 to the object reflected in the image file corresponding to the front camera 20 may be calculated using a known image processing technique.

Then, the degree-of-importance determination unit 9 determines the degree of importance of each of a plurality of image files based on the distance to the object. Typically, the degree-of-importance determination unit 9 determines the degree of importance of each of the plurality of image files such that the image file has the highest degree of importance in which the object having the shortest distance from the own vehicle to the object is reflected. Specifically, the degree-of-importance determination unit 9 determines the degree of importance of each of the plurality of image files such that the degree of importance of the image file is higher as the distance from the own vehicle to the object becomes relatively shorter and the degree of importance of the image file is lower as the distance from the own vehicle to the object becomes relatively longer. According to the configuration described above, it is possible to highly determine the degree of importance of the image file in which the direction in which the cause of the accident is presumed to have occurred is captured without using the acceleration sensor 24.

Fourth Embodiment

A fourth embodiment will be described below with reference to FIGS. 7 and 8. Hereinafter, a description will mainly be given with respect to differences between the present embodiment and the first embodiment, and duplicated description will not be given.

Figure 7:
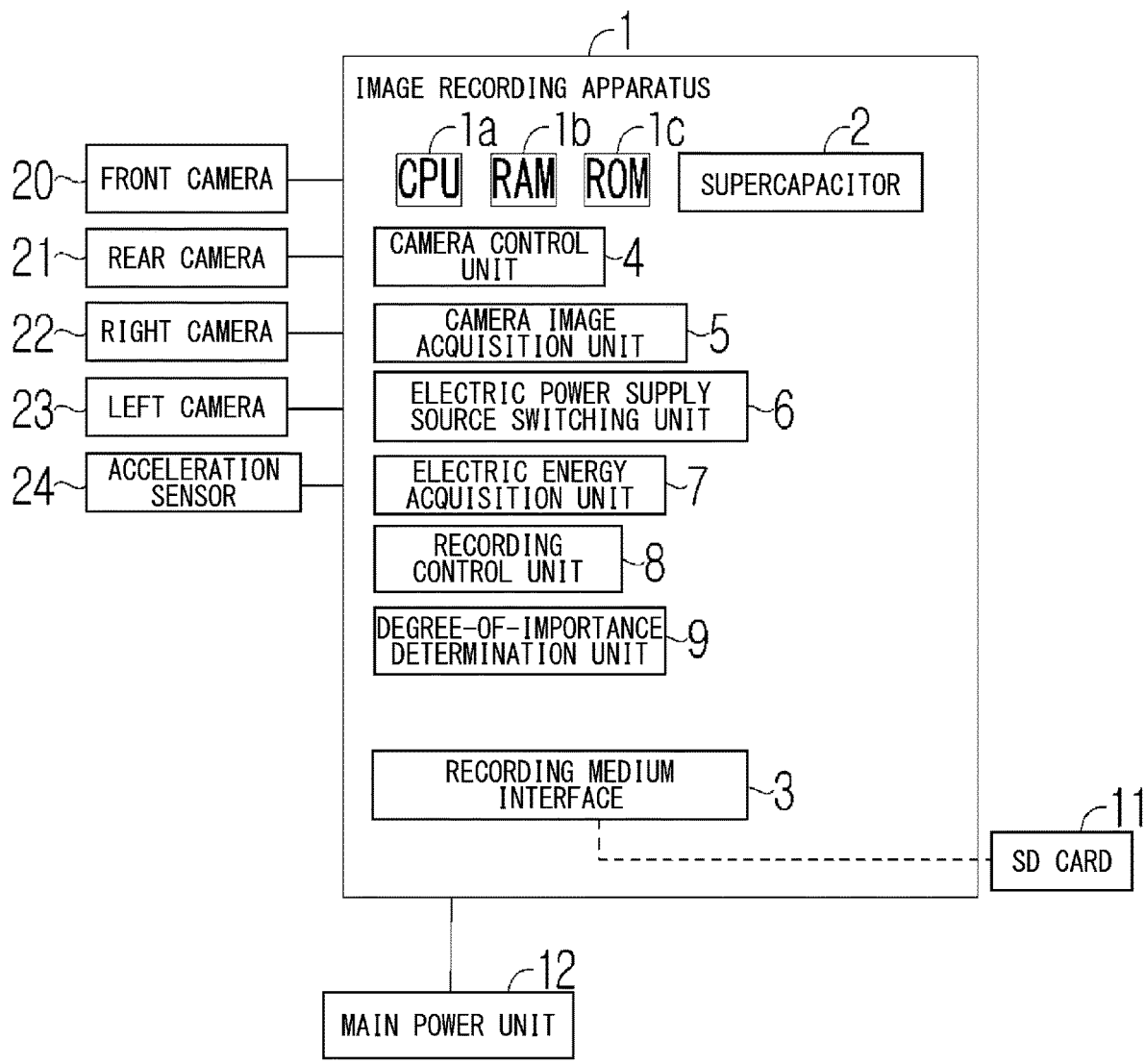
FIG. 7 is a functional block diagram of an image recording apparatus (fourth embodiment)
Figure 8:
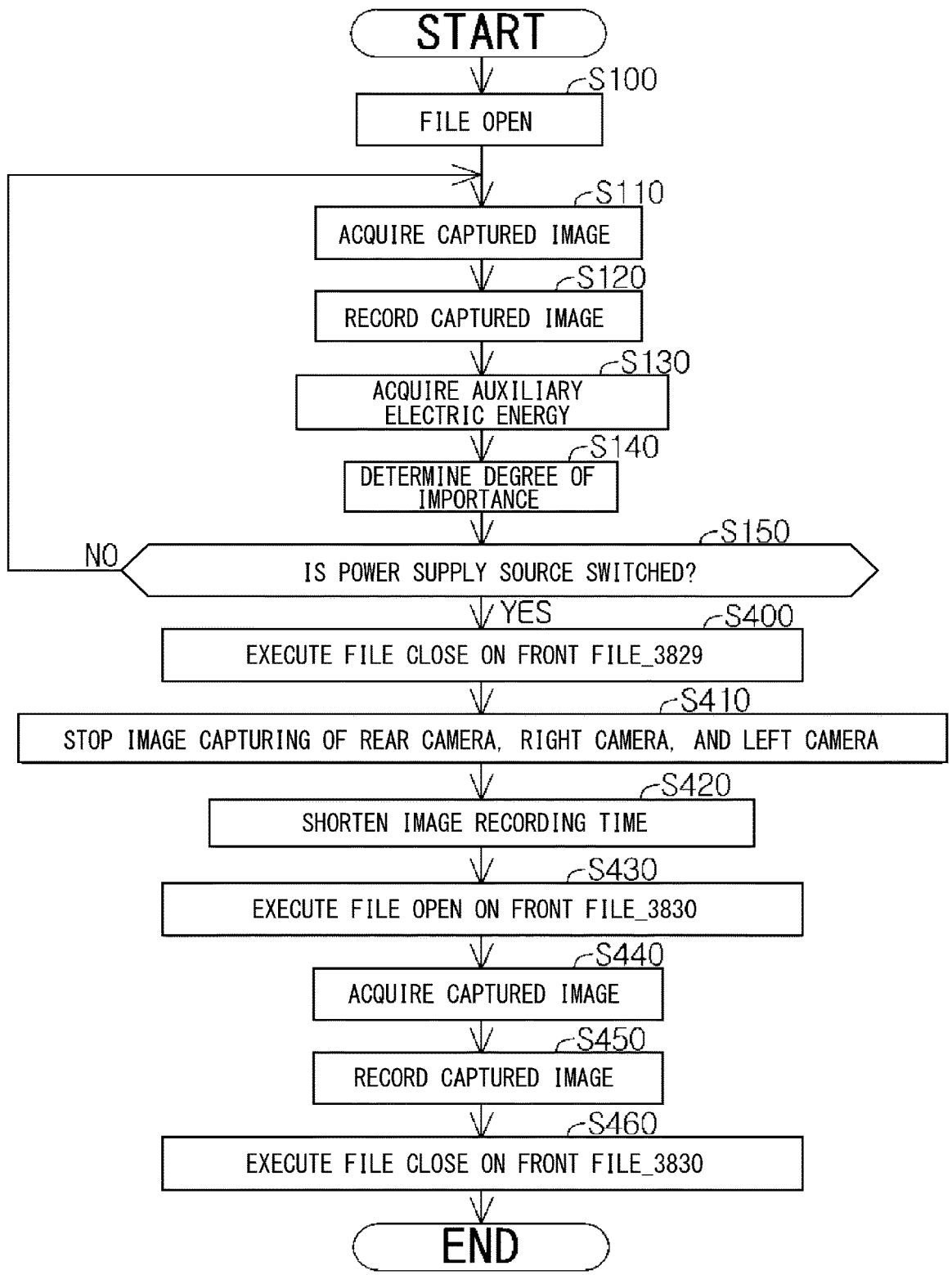
FIG. 8 is a control flowchart of the image recording apparatus (fourth embodiment).

As shown in FIG. 7, an image recording apparatus 1 of the present embodiment is not provided with the recordable duration time calculation unit 10 shown in FIG. 1.

The recording control unit 8 executes close processing on a first image file as an image file having the highest degree of importance when the electric power supply from the main power unit 12 is cut off and the electric power supply source is switched by the electric power supply source switching unit 6. According to the configuration described above, it is possible to reliably execute the close processing on the image file having the highest degree of importance, and to decide the image file having the highest degree of importance as one image file without damage. Therefore, the decided image file greatly contributes to post verification after an accident.

Then, the recording control unit 8 shortens the image recording time of the image file as compared with the case before the electric power supply source is switched, and then starts to record the captured image in a new image file. The new image file is a specific example of a second image file. When the image file determined to be the highest degree of importance is the front file_3829 at the time of start to record the captured image in the new image file, the recording control unit 8 may create a front file_3830 in the SD card 11 as an image file following the front file_3829 in order to continuously record the captured image from the front camera 20. However, alternatively, image files corresponding to all the camera control units 4 may be created in the SD card 11.

The recording control unit 8 shortens the image recording time according to the auxiliary electric energy of the supercapacitor 2 when shortening the image recording time of the image file as compared with the case before the electric power supply source is switched. For example, when the auxiliary electric energy serving as surplus power of the supercapacitor 2 is 0.05 Wh and the power consumption per hour of the image recording apparatus 1 is 5 Wh, the image recording apparatus 1 can be continuously operated for 36 seconds by the electric power supply from the supercapacitor 2. Accordingly, in this case, the recording control unit 8 sets the image recording time of the image file to 36 seconds or shorter than 36 seconds.

Next, the operation of the image recording apparatus 1 will be described with reference to FIG. 8. Processes from S100 to S150 are the same as the processes shown in FIG. 4, and thus will not be described. Hereinafter, a description will be continued assuming that the first image file as the image file having the highest degree of importance determined by the degree-of-importance determination unit 9 is the front file_3829.

S400:
First, the recording control unit 8 executes close processing on the front file_3829.

S410:
Next, the camera control unit 4 stops the image capturing of the cameras other than the front camera 20 corresponding to the front file_3829, that is, the rear camera 21, the right camera 22, and the left camera 23.

S420:
Next, the recording control unit 8 shortens the image recording time of the image file according to the auxiliary electric energy.

S430:
Next, the recording control unit 8 creates a front file_3830 as a new image file for recording the captured image from the front camera 20 in the SD card 11.

S440:
Next, the camera image acquisition unit 5 acquires a captured image from the front camera 20, and temporarily stores the acquired captured image in the RAM 1b.

S450:
Next, the recording control unit 8 acquires captured images from the RAM 1b for a predetermined number of frames, and records the acquired plurality of captured images in the front file_3830.

S460:
Then, the recording control unit 8 executes close processing on the front file_3830 when the image recording time shortened in S420 has elapsed.

Although the fourth embodiment has been described above, the fourth embodiment has the following features.

When the electric power supply from the main power unit 12 is cut off and the electric power supply source is switched by the electric power supply source switching unit 6, the recording control unit 8 executes the close processing on the first image file as the image file having the highest degree of importance, shortens the image recording time of the image file according to the auxiliary electric energy, and then starts to record the captured image in the new image file. When the electric power supply from the main power unit 12 is cut off and the electric power supply source is switched by the electric power supply source switching unit 6, the recording control unit 8 executes the close processing on the first image file as the image file having the highest degree of importance, and starts to record the captured image in the second image file in which the image recording time of the image file is set according to the auxiliary electric energy. According to the configuration described above, the first image file decided as one image file greatly contributes to post verification after an accident. Further, since the image recording time of the new image file is decided according to the auxiliary electric energy, the image recording time of the new image file can be set to a time suitable for the auxiliary electric energy.

Although the first to fourth embodiments have been described above, these embodiments can be implemented in any combination. In addition, each of the embodiments described above can be changed as follows, for example.

In other words, the recording control unit 8 may record the captured image as an image file in the SD card 11 after executing the close processing on the first image file.

In the above-described example, each of the programs can be stored and provided to a computer using various types of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory). Examples of non-transitory computer readable media further include CD-R, CD-R/W, and semiconductor memories (including a mask ROM). Examples of non-transitory computer readable media further include PROM (programmable ROM), EPROM (erasable PROM), flash ROM, RAM (random access memory). The program may be supplied to a computer by various types of transitory computer readable media. Examples of non-transitory computer readable media include electrical signals, optical signals, and electromagnetic waves. The non-transitory computer readable media can supply the program to a computer via wired communication lines such as electric wires and optic al fibers or a wireless communication line.

The present disclosure is applicable to an image recording apparatus provided with an auxiliary power unit such as a supercapacitor.

According to the present embodiment, a technique is provided which relates to an image file when an electric power supply source is switched from a main power unit to an auxiliary power unit in a case where the vehicle is equipped with a plurality of cameras, to protect recording of the image file according to the degree of importance and optimize a recording time.

What is claimed is:

1. A recording control apparatus for a plurality of images, the recording control apparatus comprising:
   a plurality of cameras;
   an auxiliary power unit;
   an acceleration sensor;
   an electric power supply source switch configured to switch an electric power supply source to the auxiliary power unit from a main power unit when an electric power supply from the main power unit is cut off; and
   a processor coupled to a memory storing instructions to permit the processor to function as:
      an electric energy calculation unit configured to calculate auxiliary electric energy serving as electric energy capable of being supplied by the auxiliary power unit;
      a recorder configured to record images captured by the cameras in image files for respective cameras of the plurality of cameras;
      a degree-of-importance determination unit configured to determine one of the image files of the images, captured by the cameras having an image capturing direction closest to a direction opposite to a direction of acceleration detected by the acceleration sensor among the plurality of cameras, as an image file having a highest degree of importance; and
      a recordable duration time calculation unit configured to calculate a recordable duration time, during which the captured images is continuously recordable, by dividing auxiliary electric energy, serving as surplus power obtained by subtracting electric energy required for performing a close processing on the image file from the auxiliary electric energy, by power consumption per unit time of the image recording apparatus in performing recording of the captured image, the close processing being a process of completing information in a format of each of image files to be established as a file abled to be handled by other devices,
   wherein the recorder sets a timing at which the close processing is executed on the image file having the highest degree of importance as a timing at which the recordable duration time has elapsed.

2. The recording control apparatus according to claim 1, further comprising an image-capturing control unit configured to control the plurality of cameras,
   wherein the plurality of cameras are configured to be operated by an electric power supply from the recording control apparatus, and
   wherein the image-capturing control unit stops image capturing of cameras other than the camera corresponding to the image file when the electric power supply from the main power unit is cut off and the electric power supply source is switched by the electric power supply source switch.

3. The recording control apparatus according to claim 1, wherein the recorder executes close processing on the image file, and then executes close processing on at least one of image files for recording captured images other than the camera corresponding to the image file.

4. The recording control apparatus according to claim 3, wherein, after executing the close processing on the image file, the recorder sets, based on the degree of importance of each of the image files for recording the captured images other than the camera corresponding to the image file, a recordable duration time for each of the image files for recording the captured images other than the camera corresponding to the image file, and executes close processing on each of the image files for recording the captured images other than the camera corresponding to the image file at a timing based on the recordable duration time.

5. The recording control apparatus according to claim 1, wherein the processor is further configured to function as a motion vector calculation unit configured to calculate a motion vector for each of the plurality of image files, and wherein the degree-of-importance determination unit determines a degree of importance of each of the plurality of image files, based on the motion vector.

6. The recording control apparatus according to claim 1, wherein the processor is further configured to function as an object detection unit configured to detect an object appearing in the image file for each of the plurality of image files and calculate a distance to the object, and
wherein the degree-of-importance determination unit determines a degree of importance of each of the plurality of image files, based on the distance to the object.

7. A recording control apparatus for a plurality of images, the recording control apparatus comprising:
a plurality of cameras;
an auxiliary power unit;
an acceleration sensor;
an electric power supply source switch configured to switch an electric power supply source to the auxiliary power unit from a main power unit when an electric power supply from the main power unit is cut off; and
a processor coupled to a memory storing instructions to permit the processor to function as:
an electric energy calculation unit configured to calculate auxiliary electric energy serving as electric energy capable of being supplied by the auxiliary power unit;
a recorder configured to record images captured by the cameras in image files for respective cameras of the plurality of cameras; and
a degree-of-importance determination unit configured to determine one of the image files of the images, captured by a cameras having an image capturing direction closest to a direction opposite to a direction of acceleration detected by the acceleration sensor among the plurality of cameras, as an image file having a highest degree of importance,
wherein the recorder executes a close processing on the image file having the highest degree of importance, and starts to record a newly captured image captured by a camera having an image capturing direction closest to a direction opposite to a direction of acceleration detected by the acceleration sensor as a new image file, the close processing being a process of completing information in a format of each of image files to be established as a file abled to be handled by other devices.

8. A recording control method of a recording control apparatus for a plurality of images including an auxiliary power unit, the method comprising:
acquiring captured images from a plurality of cameras;
switching an electric power supply source to the auxiliary power unit from a main power unit when an electric power supply from the main power unit is cut off;
calculating auxiliary electric energy serving as electric energy capable of being supplied by the auxiliary power unit;
recording the images captured in the acquiring captured images in image files for respective one of the plurality of cameras
determining one of the image files of the image captured by cameras, having an image capturing direction closest to a direction opposite to a direction of acceleration detected by an acceleration sensor among the plurality of cameras, as an image file having a highest degree of importance; and
calculating a recordable duration time, during which the captured image is continuously recordable, by dividing auxiliary electric energy, serving as surplus power obtained by subtracting electric energy required for performing a close processing on the file from the auxiliary electric energy, by power consumption per unit time of the image recording apparatus in performing recording of the captured image, the close processing being a process of completing information in a format of each of image files to be established as a file abled to be handled by other devices,
wherein the recorder sets a timing at which the close processing is executed on the image file having the highest degree of importance as a timing at which the recordable duration time has elapsed.

9. A non-transitory computer readable medium storing a program causing a computer to execute the recording control method according to claim 8.

* * * * *